(12) United States Patent
Fukatsu et al.

(10) Patent No.: US 6,281,932 B1
(45) Date of Patent: *Aug. 28, 2001

(54) IMAGE PICKUP APPARATUS HAVING A COMPLEMENTARY COLOR-TO-PRIMARY COLOR CONVERSION MATRIX

(75) Inventors: Tsutomu Fukatsu, Yokohama; Makoto Shimokoriyama, Kawasaki, both of (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/470,330

(22) Filed: Jun. 6, 1995

Related U.S. Application Data

(63) Continuation of application No. 08/081,832, filed on Jun. 23, 1993, now abandoned.

(30) Foreign Application Priority Data

Jun. 23, 1992 (JP) .................................................. 4-188669

(51) Int. Cl.[7] .............................. H04N 3/14; H04N 9/083; H04N 9/73; H04N 9/67
(52) U.S. Cl. .......................... 348/277; 348/279; 348/228; 348/659
(58) Field of Search .................................... 358/520, 523; 348/256, 271, 279, 649–654, 659, 660, 655–658, 266, 272, 273, 276, 277, 280

(56) References Cited

U.S. PATENT DOCUMENTS

| 5,121,193 | * | 6/1992 | Nishimura et al. | 348/279 |
| 5,134,465 | * | 7/1992 | Ohki et al. | 348/649 |
| 5,170,249 | * | 12/1992 | Ohtsubo et al. | 348/266 |
| 5,260,774 | * | 11/1993 | Takayama | 348/655 |

FOREIGN PATENT DOCUMENTS

2165790 * 6/1990 (JP) ................................. H04N/9/67

* cited by examiner

Primary Examiner—John W. Miller
(74) Attorney, Agent, or Firm—Morgan & Finnegan, L.L.P.

(57) ABSTRACT

Color separating characteristics which are preferable in case of obtaining the primary color components are obtained from an image pickup signal by using a color separation matrix. A luminance signal is obtained by a luminance signal formation processing section from the signal supplied from an image pickup device through an A/D converter and chrominance signals are obtained by a chrominance signal separation processing section. In the chrominance signal separation processing section, the signals obtained from the image pickup signal are multiplied with a color separation matrix, thereby obtaining primary color components RGB. The color separation matrix is constructed by coefficients for white balance adjustment and coefficients for adjustment in consideration of the primary color components of the image pickup signal.

5 Claims, 3 Drawing Sheets

FIG. 1
PRIOR ART

|  | COLUMN M | COLUMN M+1 |
|---|---|---|
| LINE N | Mg | G |
| LINE N+1 | Cy | Ye |
| LINE N+2 | G | Mg |
| LINE N+3 | Cy | Ye |
| LINE N+4 | Mg | G |

5a

IMAGE PICKUP APPARATUS HAVING A COMPLEMENTARY COLOR-TO-PRIMARY COLOR CONVERSION MATRIX

This is a continuation of application Ser. No. 08/081,832, filed on Jun. 23, 1993 now abandoned.

BACKGROUND OF THE INVENTION

1. Field of the Invention

The present invention relates to an image pickup apparatus using a solid state image pickup device.

2. Related Background Art

A single plate color camera has, for example, color filters and a single solid state image pickup device to form an image through each color filter. The color filters for transmitting different color lights are sequentially arranged on photosensitive elements on the solid state image pickup device, an object image is formed on the solid state image pickup device, and chrominance signals and a luminance signal which have been space modulated are obtained from the solid state image pickup device.

In such a color camera, there is a color camera which obtains chrominance signals from an image pickup device having a color filter arrangement as shown in FIG. 1 by executing the following processes.

In the image pickup device, a video signal is generated by performing the following scan. In even number fields, the charges of the photosensitive elements of the n-th and (n+1)th horizontal lines which are neighboring in the vertical direction and the charges of the photosensitive elements of the (n+2)th and (n+3)th horizontal lines are respectively added and transferred. In the odd number fields, the charges of the photosensitive elements of the (n+1)th and (n+2)th horizontal lines which are neighboring in the vertical direction and the charges of the photo sensitive elements of the (n+3)th and (n+4)th horizontal lines are respectively added and transferred and outputted. By such scans, signals constructed by the following primary color chrominance signal component ratios are outputted.

n-th line of the even number fields:
  on the mth column, Mg+Cy=R+G+2B;WB
  on the (m+1)th column, G+Ye=R+2G;GR
(n+2)th line of the even number field:
  on the m-th column, G+Cy=2G+B;GB
  on the (m+1)th column, Mg+Ye=2R+G+B;WR
(n+1)th line of the odd number field:
  on the m-th column, Cy+G=2G+B;GB
  on the (m+1)th column, Ye+Mg=2R+G+B;WR
(n+3)th line of the odd number field:
  on the m-th column, Cy+Mg=R+G+2B ;WB
  on the (m+1)th column, Ye+G=R+2G;GR A matrix including four predetermined numbers is multiplied to such four kinds of signals WB, WR, GR, and GB, thereby extracting the primary color component of one of three primary colors R, G, and B. Therefore, primary color signals of red (R), green (G), and blue (B) are obtained by, for example, executing arithmetic operating processes based on the following numerical expression (1).

$$\begin{pmatrix} R \\ G \\ B \end{pmatrix} = \begin{pmatrix} x_0, x_1, x_2, x_3 \\ y_0, y_1, y_2, y_3 \\ z_0, z_1, z_2, z_3 \end{pmatrix} * \begin{pmatrix} WB \\ WR \\ GR \\ GB \end{pmatrix} \qquad (1)$$

That is, R is obtained by respectively multiplying $x_0$, $x_1$, $x_2$, and $x_3$ to the four kinds of signals WB, WR, GR, and GB. G is obtained by respectively multiplying $y_0$, $y_1$, $y_2$, and $y_3$ to the four kinds of signals WB, WR, GR, and GB. B is obtained by respectively multiplying $z_0$, $z_1$, $z_2$, and $z_3$ to the four kinds of signals WB, WR, GR, and GB.

Since the above four kinds of signals are output by the above scanning method in a time-division manner, they are not simultaneously derived. Therefore, it is constructed so that the same kind of signals can be always derived by delay elements of one horizontal line and one pixel and a selecting circuit.

In the single plate image pickup device, however, a luminance signal component is also separated from the four kinds of chrominance signal components obtained from the image pickup device. Actual color transmitting characteristics of color filters Mg, Ye, Cy, and G in FIG. 1 exhibit RGB transmitting characteristics which are different from those mentioned above. There is a drawback such that the RGB signals obtained by performing color separating processes or demodulating processes don't show good color separating characteristics.

On the other hand, since the RGB primary color components are directly obtained from the output of the image pickup device, there is a drawback such that the hue cannot be easily adjusted as it is demanded.

SUMMARY OF THE INVENTION

It is an object of the present invention to provide an image pickup apparatus which can solve the drawbacks in the conventional techniques as mentioned above.

Another object of the invention is to provide an image pickup apparatus which can obtain a color separation matrix of good color separating characteristics from image pickup signal data of an object whose color is to be separated and can separate the color.

According to a preferred embodiment of the present invention, there is provided an image pickup apparatus having a single solid state image pickup device for forming an image input through an individual color filter, wherein the apparatus has color separating means for executing arithmetic operating processes to output signals of the image pickup device corresponding to the lights of different colors, thereby obtaining primary color components. Color filters for transmitting the lights of different colors are sequentially arranged on photosensitive elements on the solid state image pickup device, an object image is formed on the solid state image pickup device, and chrominance signals and a luminance signal which have been space modulated are obtained from the solid state image pickup device. The image pickup apparatus obtains arithmetic operation coefficients of the color separating means from the image pickup output signal of the image pickup device.

According to the embodiment of the invention as mentioned above, in consideration of the primary color component compositions of an object, a color separation matrix is approximated from the image pickup signal data of the object which color is to be separated to a complementary color or a pure color, so that a color separation matrix of good color separating characteristics or a color separation matrix in which other color components are not mixed is obtained.

According to another embodiment, by multiplying hue adjustment coefficients to the primary color component compositions of an object, a color separation matrix is approximated from the image pickup signal data of the object whose color is to be separated to a complementary color, hue adjustment coefficients are multiplexed in the complementary color space, and the color separation matrix is approximated, thereby constructing a color separation matrix having desired color separating characteristics.

According to still another embodiment, the image pickup signal data of an object whose color is to be separated to a: pure color is mapped to a complementary color system space, hue adjustment coefficients are multiplied in the complementary color system space to the image pickup signal data, and the data is again mapped into an RGB primary color space, thereby approximating a color separation matrix.

The above and other objects and features of the present invention will become apparent from the following detailed description and the appended claims with reference to the accompanying drawings.

BRIEF DESCRIPTION OF THE DRAWINGS

FIG. 1 is a constructional diagram showing an arrangement of color filters;

DETAILED DESCRIPTION OF THE PREFERRED EMBODIMENTS

An embodiment of the present invention will be described in detail hereinbelow with reference to the drawings.

Figure 2:
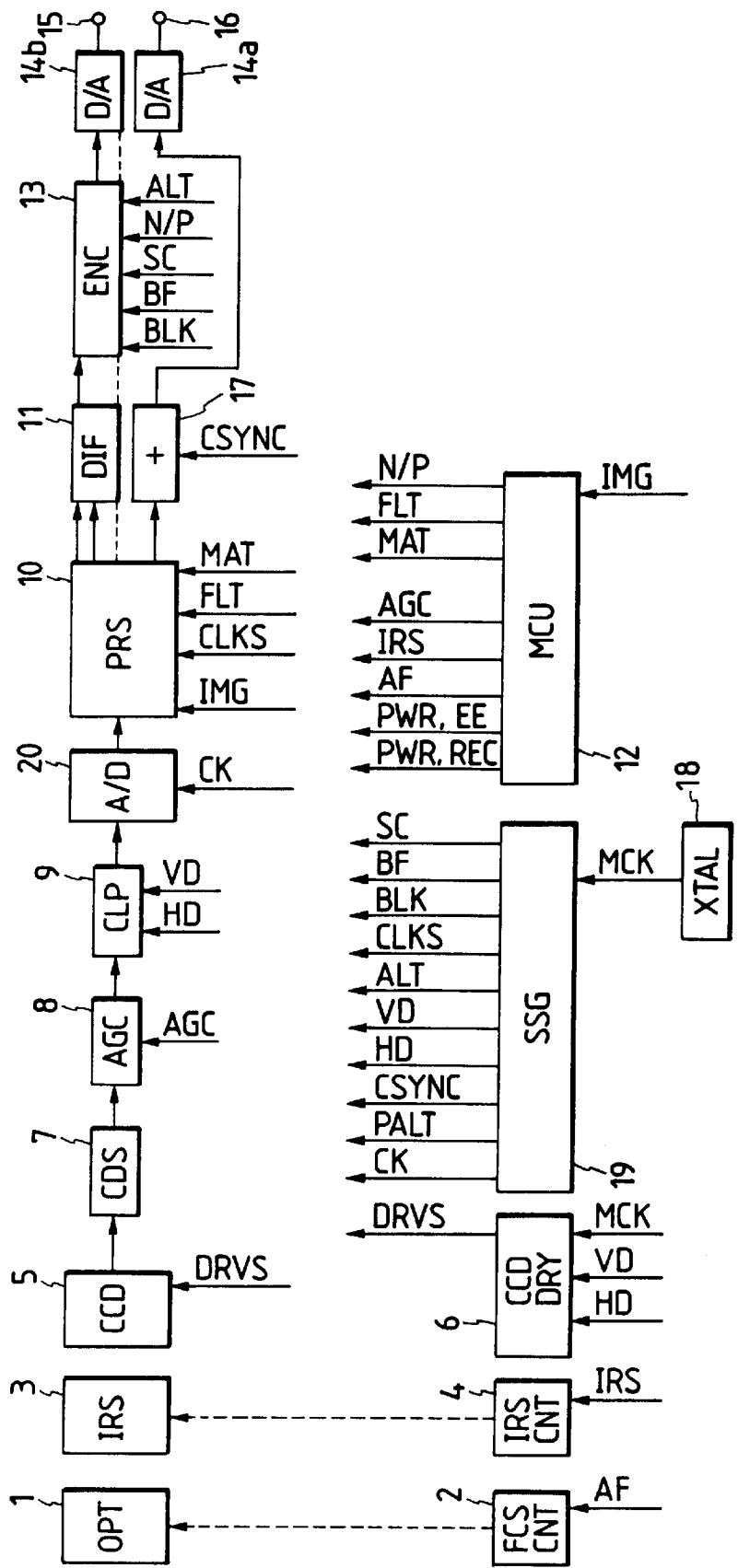
FIG. 2 is a block diagram showing an embodiment of the present invention.

FIG. 2 is a block diagram showing an embodiment of an image pickup apparatus of the invention. Reference numeral 1 denotes an image pickup optical processing system such as a lens or the like; 2 a focus control system to control a focal point of the image pickup lens; 3 a diaphragm to control an incident light amount; 4 a diaphragm control system to control the incident light amount; and 5 a 2-dimensional color image pickup device as a photoelectric converting device including microcolor separation filters having a color arrangement shown in, for instance, FIG. 1.

Reference numeral 6 denotes a driving circuit to drive the image pickup device 5. The driving circuit 6 generates a control signal to transfer charges accumulated in a photoelectric converting element in the image pickup device for a period of time corresponding to a vertical blanking period of a television signal to a vertical transfer section. The driving circuit also generates a control signal to transfer the changes in a horizontal transfer section which were transferred from the vertical transfer section for a period of time corresponding to a video signal effective period of the television signal.

Reference numeral 7 denotes a correlated double sampling circuit (CDS) to eliminate reset, clock noises of the output signal from the image pickup device; 8 an automatic gain control (AGC) which receives an output signal of the CDS 7 and variably changes a gain in accordance with a control voltage at a control voltage input terminal; 9 a clamping circuit to fix a black level of the input video signal to a predetermined voltage; 10 a signal processing circuit to produce a luminance signal and primary color signals in a television signal from an AGC output signal; and 11 a color difference matrix processing section to form color difference signals (R–Y) and (B–Y) from the primary color signals derived from the signal processing circuit 10.

Reference numeral 13 denotes a carrier chrominance signal modulating circuit to form a carrier chrominance signal based on the broadcasting standard from the color difference signals derived from the signal processing circuit 10; 14$b$ a D/A converter to convert a digital signal data into an analog signal; and 15 a carrier chrominance signal output terminal.

Reference numeral 12 denotes a micro control unit (MCU) which receives digital data regarding the signal derived from the signal processing circuit 10 and outputs control signals to the signal processing circuit 10, focus control system 2, incident light amount control system 3, automatic gain control 8, and the like on the basis of the data obtained by processing the digital data.

Reference numeral 17 denotes an adder to synthesize the luminance signal Y obtained from the signal processing circuit 10 and a composite sync signal CSYNC; 14$a$ a D/A converter to convert the digital luminance signal to which a sync signal has been inserted into the digital luminance signal; and 16 an output terminal of the analog luminance signal.

Reference numeral 18 denotes a quartz oscillator to oscillator reference clocks MCK.

Reference numeral 20 denotes a timing controller for generating an A/D conversion clock to generate digital data according to the input signal, a horizontal sync signal HD, a vertical sync signal VD, an NTSC/PAL standard switching signal N/P, clocks CLOCKS of each frequency and phase which are necessary in each of the processing sections, a blanking pulse BLK to form a television signal, a burst flag pulse BF, a color subcarrier SC, a line sequential signal ALT, a dot sequential signal PALT, a composite sync signal CSYNC, and the like on the basis of reference clocks MCK.

Figure 3:
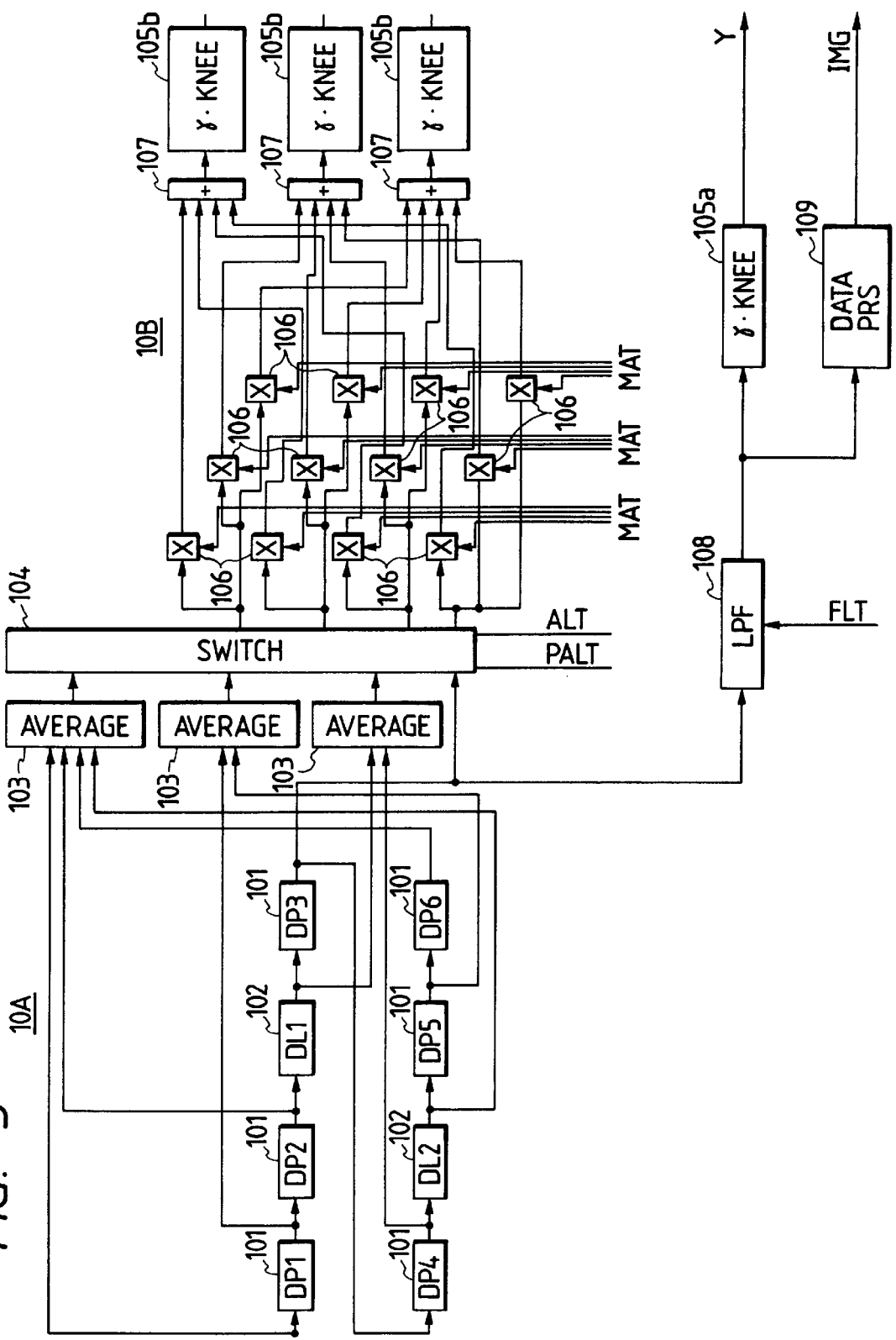
FIG. 3 is a block diagram showing an embodiment of a signal processing circuit.

FIG. 3 is a diagram showing an example of an internal construction of the signal processing circuit 10 shown in FIG. 2. Reference numeral 10A denotes a luminance signal formation processing section and 10B indicates a chrominance signal separation processing section.

Reference numeral 101 denotes digital data delay circuits ($DP_1$ to $DP_6$) of a fixed length (one horizontal pixel); 102 digital data delay circuits ($DL_1$ to $DL_2$) of a fixed length (one horizontal line—two pixels); 103 an average circuit to obtain a weighted mean of the input and delayed digital data; 104 a switch to switch outputs of the average circuits 103; 106 a multiplier to multiply an output of the switch 104 to matrix coefficients MAT; 107 an adder to add multiplied outputs; 105$b$ a gamma knee processing section to execute a gamma correction of each added output and a level compression of a high luminance portion; 108 a low pass filter (LPF) to which an output signal of the digital data delay circuit $DP_3$ 101 is supplied; 109 a data processing section to execute pre-processes so as to make it possible to easily fetch data signals which are necessary when the MCU 12 controls each of the above processing systems; and 105$a$ a gamma knee processing section for the luminance signal.

An incident light amount of an object (not shown) is adjusted by the image pickup lens 1 and diaphragm control system 3 and is accumulated as charges into a photo sensitive accumulating section of the image pickup device 5 such as an interline type CCD. The accumulated charges are transferred to a vertical transfer section in an image pickup device (not shown) within a period of time corresponding to a vertical blanking period of the video signal. The charges which were transferred to the vertical transfer section are sent to a horizontal transfer section (not shown) in the image pickup device within a horizontal blanking period. The charges which were transferred to the horizontal transfer section are generated therefrom within an effective video period of time and are converted into a voltage. A sequence of signals which are read out and signal compositions will now be shown hereinbelow.

n-th line of the even number fields:
  m-th column, Mg'+Cy'=xR+yG+zB;WB
  (m+1)th column, G'+Ye'=xR+yG+zB;GR
(n+2)th line of the even number fields:
  m-th column, G'+Cy'=xR+yG+zB;GB
  (m+1)th column, Mg'+Ye'=xR+yG+zB;WR
(n+1)th line of the odd number fields:
  m-th column, Cy'+G'=xR+yG+zB;GB
  (m+1)th column, Ye'+Mg'=xR+yG+zB;WR
(n+3)th line of the odd number fields:
  m-th column, Cy'+Mg'=xR+yG+zB;WB
  (m+1)th column, Ye'+G'=xR+yG+zB;GR A matrix to form the RGB signal data from the above four kinds of signal data is constructed as follows.

It is now assumed that images of three objects whose demodulation outputs (R, G, B) are $$(R, G, B) = (X_0, X_1, 0)$$
$$(0, Y_0, Y_1)$$
$$(Z_0, 0, Z_1)$$

were picked up. In this case, the demodulation outputs (R, G, B) are derived by processes similar to those in the above expression (1).

That is, R is obtained by respectively multiplying $X_0$, $X_1$, and 0 to the four kinds of signals WB, WR, GR, and GB. G is obtained by respectively multiplying 0, $Y_0$, and $Y_1$ to the four kinds of signals WB, WR, GR, and GB. B is obtained by respectively multiplying $Z_0$, 0, and $Z_1$ to the four kinds of signals WB, WR, GR, and GB.

As for each object, when the following three kinds of signal data Sig (WB, WR, GR, GB) are obtained, Sigx=(WBX', WRX', GRX', GBX')
Sigy=(WBy', WRy', GRy', GBy')
Sigz=(WBz', WRz', GRz', GBZ')

a color separation matrix is set to $$A = [\beta i \; \alpha ij] \quad (i=0,1,2 \quad j=0,1,2,3)$$

where, $\beta_i$ denotes an adjustment coefficient which is ordinarily used for adjustment of a white balance and $\alpha_{ij}$ denotes an adjustment coefficient which is used for adjustment of a hue according to the present invention.

The color separation matrix A satisfies the following equations.

A*Sigx=(X, 0, 0)
A*Sigy=(0, Y, 0)
A*Sigz=(0, 0, Z)

where, X=1, Y=1, and Z=1.

By solving the above equations, the adjustment coefficients $\alpha_{ij}$ are obtained as follows.

$$\alpha i0 = (f1 - f2 \; ai3)/f0$$
$$\alpha i1 = (e1 - e2 \; ai3)/e0$$
$$\alpha i2 = (d1 - d2 \; ai3)/d0$$
$$ai3 \quad (i=0,1,2)$$

where,
d0=b0 a1−b1 a0
d1=b0 a3−a0 b3
d2=b0 a2−b2 a0
e0=a0
e1=a3−a1 d1/d0
e2=a2−a1 d2/d0
f0=WBx
f1={X−WRx e1/e0−GRx d1/d0 (i=0)
   −WRx e1/e0−GRx d1/d0 (i=1,2)
f2=GBx−WRz e2/e0−GRx d2/d0
Now, WBx=(Y0Z1WBx'−Z1X1WBy'+X1Y1WBz')/(X0Y0Z1+X1Y1Z0)

WBy=(Y1Z0WBx'+Z1X0WBy'−X0Y1WBz')/(X0Y0Z1+X1Y1Z0)

WBz=(−Y0Z0WBx'+Z0X1WBy'+X0Y0WBz')/(X0Y0Z1+X1Y1Z0)

WRX=(Y0Z1WRx'−Z1X1WRy'+X1Y1WRz')/(X0Y0Z1+X1Y1Z0)

WRy=(Y1Z0WRx'+Z1X0WRy'−X0Y1WRz')/(X0Y0Z1+X1Y1Z0)

WRz=(−Y0Z0WRx'+Z0X1WRy'+X0Y0WRz')/(X0Y0Z1+X1Y1Z0)

GRx=(Y0Z1GRx'−Z1X1GRy'+X1Y1GRz')/(X0Y0Z1+X1Y1Z0)

GRy=(Y1Z0GRx'+Z1X0GRy'−X0Y1GRz')/(X0Y0Z1+X1Y1Z0)

GRz=(−Y0Z0GRx'+Z0X1GRy'+X0Y0GRz')/(X0Y0Z1+X1Y1Z0)

GBx=(Y0Z1GBx'−Z1X1GBy'+X1Y1GBz')/(X0Y0Z1+X1Y1Z0)

GBy=(Y1Z0GBx'+Z1X0GBy'−X0Y1GBz')/(X0Y0Z1+X1Y1Z0)

GBz=(−Y0Z0GBx'+Z0X1GBy'+X0Y0GBz')/(X0Y0Z1+X1Y1Z0)

a0=WBy WRx−WBxWRy a1=WBy GRx−WBxGRy a2=WBy GBx−WBxGBy $$a3 = \begin{cases} WBy\,X & (i=0) \\ -WBx\,Y & (i=1) \\ 0 & (i=2) \end{cases}$$

b0=WBz WRx−WBxWRz b1=WBz GRx−WBxGRz b2=WBz GBx−WBxGBz $$b3 = \begin{cases} WBy\,X & (i=0) \\ 0 & (i=1) \\ -WBx\,Z & (i=2) \end{cases}$$

In another embodiment, the above $WB_x$ and the like become as follows.

$WBx=(K1Y0K2Z1WBx'-K2Z1K0X1WBy'+K0X1K1Y1WBz')/(K0X0K1Y0K2Z1+K0X1K1Y1K2Z0)$ $WBy=(K1Y1K2Z0WBx'+K2Z1K0X0WBy'-K0X0K1Y1BWz')/(K0X0K1Y0K2Z1+K0X1K1Y1K2Z0)$ $WBz=(-K1Y0K2Z0WBx'+K2Z0K0X1WBy'+K0X0K1Y0WBz')/(K0X0K1Y0K2Z1+K0X1K1Y1K2Z0)$ $WRx=(K1Y0K2Z1WRx'-K2'Z1K0X1WRy'+K0X1K1Y1WRz')/(K0X0K1Y0K2Z1+K0X1K1Y1K2Z0)$ $WRy=(K1Y1K2Z0WRx'+K2Z1K0X0WRy'-K0X0K1Y1WRz')/(K0X0K1Y0K2Z1+K0X1K1Y1K2Z0)$ $WRz=(-K1Y0K2Z0WRx'+K2Z0K0X1WRy'+K0X0K1Y0WRz')/(K0X0K1Y0K2Z1+K0X1K1Y1K2Z0)$ $GRx=(K1Y0K2Z1GRx'-K2Z1K0X1GRy'+K0X1K1Y1GRz')/(K0X0K1Y0K2Z1+K0X1K1Y1K2Z0)$ $GRy=(K1Y1K2Z0GRx'+K2Z1K0X0GRy'-K0X0K1Y1GRz')/(K0X0K1Y0K2Z1+K0X1K1Y1K2Z0)$ $GRz=(-K1Y0K2Z0GRx'+K2Z0K0X1GRy'+K0X0K1Y0GRz')/(K0X0K1Y0K2Z1+K0X1K1Y1K2Z0)$ $GBX=(K1Y0K2Z1GBx'-K2Z1K0X1GBy'+K0X1K1Y1GBz')/(K0X0K1Y0K2Z1+K0X1K1Y1K2Z0)$ $GBy=(K1Y1K2Z0GBx'+K2Z1K0X0GBy'-K0X0K1Y1GBz')/(K0X0K1Y0K2Z1+K0X1K1Y1K2Z0)$ $GBz=(-K1Y0K2Z0GBx'+K2Z0K0X1GBy'+K0X0K1Y0GBz')/(K0X0K1Y0K2Z1+K0X1K1Y1K2Z0)$ where, $K_0$, $K_1$, $K_2$ denote hue adjustment coefficients and signal levels of yellow, cyan, and magenta after completion of the color separating processes can be varied, respectively.

In further another embodiment, $WBx'=WBx''+WBy''$ $WBy'=WBy''+WBZ''$ $WBz'=WBz''+WBx''$ $WBx=(k1k2WBx'-k2k0WBy''+k0k1WBz')/2k0k1k2$ $WBy=(k1k2WBx'-k2k0WBy''+k0k1WBz')/2k0k1k2$ $WBz=(-k1k2WBx'-k2k0WBy''+k0k1WBz')/2k0k1k2$ $WRx=(k1k2WRx'-k2k0WRy''+k0k1WRz')/2k0k1k2$ $WRy=(k1k2WRx'-k2k0WRy''+k0k1WRz')/2k0k1k2$ $WRz=(-k1k2WRx'-k2k0WRy''+k0k1WRz')/2k0k1k2$ $GRx=(k1k2GRx'-k2k0GRy''+k0k1GRz')/2k0k1k2$ $GRy=(k1k2GRx'-k2k0GRy''+k0k1GRz')/2k0k1k2$ $GRz=(-k1k2GRx'-k2k0GRy''+k0k1GRz')/2k0k1k2$ $GBx=(k1k2GBx'-k2k0GBy''+k0k1GBz')/2k0k1k2$ $GBy=(k1k2GBx'+k2k0GBy''+k0k1GBz')/2k0k1k2$ $GBz=(-k1k2GBx'-k2k0GBy''+k0k1GBz')/2k0k1k2$ $\beta_i$ denotes coefficients for what is called a white balance process. For example, coefficients such that the integration values of RGB of a whole object image are equal or coefficients which can be varied in accordance with a color temperature or the like of a light source which is irradiated to the object are used. Even when $\alpha_{i3}$ is an arbitrary value, the color separating characteristics are preserved. Therefore, it is sufficient to select numbers so as to obtain a desired dynamic range of the signal, a desired two-dimensional frequency response which is decided by the arrangement of the color filters, and the like. The color separation matrix is unconditionally determined by the above processes.

Whole signal processes will now be described hereinbelow.

Clock components and reset noises are eliminated by the CDS 7 from the image pickup video signal read out from the image pickup device by the above scan. After that, the image pickup video signal is amplified by the AGC 8 by the gain according to a gain control signal. A black level of the signal is fixed to an almost lower limit reference value of an input range of the A/D converter 20 by the clamping circuit 9 and the signal is converted into the digital data signal.

The digital signal is supplied to a delay circuit to which the one-pixel delay circuits 101 (DP-1 and DP-2) (one horizontal line—2) and the horizontal pixel delay circuit 102 DL-1, DP-3, DP-4, DL-2, DP-5, and DP-6 are connected. Output signals from the delay elements are supplied to the average circuits 103 as a following combination.

A/D, DP2, DL2, DP6

DP1, DP5

DL1, DP4

Outputs of the average circuits 103 and an output of the DP3 are supplied to the switch 104. The line sequential signal ALT and dot sequential signal PALT are supplied to control signal inputs of the switch 104. Thus, the same kind of chrominance signal data series are generated from the switch 104.

The output of the switch 104 is supplied to the multiplier 106. The output of the MCU 12 is connected to another input of the multiplier 106. A multiplier of the output of the switch 104 can be controlled from the MCU 12. The matrix coefficients A to which the coefficients $\beta_1$ for the white balance adjustment mentioned above were multiplied and which were calculated by the foregoing method are outputted from the MCU 12. Therefore, the results of the multiplications of different kinds of signals in the output of the multiplier 106 are added by the adder 107, thereby obtaining the primary color chrominance signals.

In the second and third embodiments, the coefficients obtained by changing $k_0$, $k_1$, and $k_2$ in the above matrix constructing method are supplied from the MCU to the multiplier 106. The results of the multiplications of different kinds of signals in the output of the multiplier 106 are added by the adder 107, thereby obtaining the primary color chrominance signal components.

The above output signal data is subjected to a gamma correcting process and a high level data compression by the gamma knee processing section 105. The color difference signal data is produced from the primary color signal data by the color difference signal forming section 11 in accordance with a predetermined ratio.

A phase reference according to a predetermined broadcasting standard is added to each of the above output signal data by the modulator 13 in accordance with the color burst flag timing signal BF. After that, the data whose amplitude is the same as that of the signal data and whose sign is opposite to that of the signal data is produced. The above four data series are outputted in correspondence to four kinds of phases of a subcarrier so that the data series of the opposite sign have the opposite phases at a frequency which is four times as high as a subcarrier frequency of a predetermined standard. Those output signals are converted into the analog signals by the D/A converter 14 and supplied to a band pass filter (not shown) having the subcarrier frequency as a center frequency.

As for the luminance signal, the chrominance signal modulation carrier which is decided by the pixel arrangement of the color component extraction pixels of the image pickup device is eliminated by the LPF 108 and the luminance signal is produced by the luminance signal forming section to execute the gamma process and knee process.

According to the above embodiment, since the arithmetic operation coefficients $\alpha_{ij}$ obtained from the image pickup output signal are used in addition to the coefficients $\beta_i$ for the white balance adjustment are used as matrix coefficients A, good color separating characteristics can be obtained. Color components other than the pure color components are not mixed to the color separation output at a time point when the pure color was image picked up. In case of the matrix coefficients A using the coefficients $k_1$ and $k_2$, the hue can be adjusted.

In case of actually performing the color separating process, in order to perform the white balance process, there is no restricting condition of the levels among RGB in case of obtaining a color separation matrix. Therefore, it is sufficient to set X, Y, and Z in the above matrix to arbitray real numbers other than 0.

The adjusting method according to the invention can be also applied to the case of approximating a color separation matrix from the primary color component compositions of the color image pickup device calculated by a method other than the above method.

According to the invention as mentioned above, a color separation matrix which shows good color separating characteristics can be provided. Particularly, when a complementary color is image picked up, good color separating characteristics are shown and the matrix is constructed by the image pickup data of the complementary color. Therefore, a dynamic range of the image pickup signal is effectively used. A color separation matrix in which a level balance is obtained among the separated RGB output signals because of a reason such that the colors are the same as three colors of the color filters or the like.

A color separation matrix such that color components other than the pure color components are not mixed to the color separation output at a time point when the pure color is image picked up can be provided. According to the invention, further, a color separation matrix in which the hue can be adjusted can be provided.

What is claimed is:

1. An image pickup apparatus comprising:
   image pickup means in which color filters of a predetermined set of a plurality of colors are arranged on a plurality of photo sensitive elements to obtain color signals of said predetermined set of colors, wherein said predetermined set of a plurality of colors includes complementary colors;
   complementary color-to-primary color converting matrix means for converting color signals including color signals of the complementary colors, obtained from said image pickup means into R, G, and B signals with a predetermined matrix operation using complementary color-to-primary color conversion matrix coefficients which are different from white balance adjusting coefficients, wherein said complementary color-to-primary color conversion matrix coefficients can be variably set;
   calculation means for calculating said complementary color-to-primary color conversion matrix coefficients from an output signal obtained by driving said image pickup means; and
   complementary color-to-primary color conversion matrix coefficients setting means for setting said complementary color-to-primary color conversion matrix coefficients calculated by said calculation means to said complementary color-to-primary color converting matrix means.

2. An image pickup apparatus according to claim 1, further comprising a white balance control means for adjusting said white balance adjusting coefficients based on an output from said image pickup means.

3. An image pickup apparatus according to claim 1, wherein said complementary color-to-primary color conversion matrix means includes said white balance adjusting coefficients independently from said complementary color-to-primary color conversion matrix coefficients.

4. An image pickup method for setting a complementary color-to-primary color conversion matrix in which complementary color-to-primary color conversion matrix coefficients which are different from white balance adjusting coefficients can be variably set, the method comprising:
   picking up an image and generating a first image signal:
      calculating the complementary color-to-primary color conversion matrix coefficients based on said first image signal;
      setting the complementary color-to-primary color conversion matrix coefficients calculated by said calculating step to said complementary color-to-primary color conversion matrix;
      picking up another image and generating a second image signal; and
      adjusting a white balance based on said second image signal.

5. An image pickup method according to claim 4, wherein said complementary color-to-primary color conversion matrix includes white balance adjusting coefficients independently from said complementary color-to-primary color conversion matrix coefficients.

\* \* \* \* \*

UNITED STATES PATENT AND TRADEMARK OFFICE
CERTIFICATE OF CORRECTION

PATENT NO. : 6,281,932 B1
DATED : August 28, 2001
INVENTOR(S) : Fukatsu et al.

It is certified that error appears in the above-identified patent and that said Letters Patent is hereby corrected as shown below:

Column 3,
Line 14, delete "a:" and please insert therefor -- a --

Column 6,
Line 4, delete "$ai0=(f1-f2\ ai3)/f0$" and insert therefor -- $\alpha i0=(f1-f2\ \alpha i3)/f0$ --
Line 6, delete "$ai1=(e1-e2\ ai3)/e0$" and insert therefor -- $\alpha i1=(e1-e2\ \alpha i3)/e0$ --
Line 8, delete "$ai2=(d1-d2\ ai3)/d0$" and insert therefor -- $\alpha i2=(d1-d2\ \alpha i3)/d0$ --
Line 30, delete "WRX=" and insert therefor -- WRx= --

Column 7,
Line 23, delete "GBX=" and insert therefor -- GBx= --
Line 38, delete "WBy'=WBy"+WBZ" " and insert therefor -- WBy' =WBy"+WBz" --

Column 9,
Line 23, delete "arbitray" and insert therefor -- arbitrary --

Signed and Sealed this

Seventh Day of May, 2002

Attest:

JAMES E. ROGAN
Attesting Officer
Director of the United States Patent and Trademark Office